United States Patent
Dou et al.

(10) Patent No.: US 12,435,654 B1
(45) Date of Patent: Oct. 7, 2025

(54) WORK VEHICLE AND AFTERTREATMENT SYSTEM THEREFOR

(71) Applicant: Deere & Company, Moline, IL (US)

(72) Inventors: Danan Dou, Cedar Falls, IA (US); Eric J. Hruby, Waterloo, IA (US); Eric J. Haaland, Waverly, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/756,502

(22) Filed: Jun. 27, 2024

(51) Int. Cl.
*F01N 3/20* (2006.01)
*F01N 1/08* (2006.01)
(Continued)

(52) U.S. Cl.
CPC .............. *F01N 3/208* (2013.01); *F01N 3/035* (2013.01); *F01N 1/082* (2013.01); *F01N 1/085* (2013.01);
(Continued)

(58) Field of Classification Search
CPC . F01N 1/08; F01N 1/081; F01N 1/082; F01N 1/085; F01N 3/0233; F01N 3/031; F01N 3/032; F01N 3/035; F01N 3/0878; F01N 1/163; F01N 3/2053; F01N 3/2093; F01N 3/208; F01N 3/2892; F01N 13/087; F01N 2350/06; F01N 2410/00; F01N 410/02; F01N 2410/03; F01N 2410/04; F01N 2410/06; F01N 2410/08; F01N 2410/12; F01N 2410/14; F01N 2250/02; F01N 2550/06; F01N 2550/10; F01N 2550/12; F01N 2560/05; F01N 2560/06; F01N 2560/07; F01N 2610/02;
(Continued)

(56) References Cited

U.S. PATENT DOCUMENTS

| | | | |
|---|---|---|---|
| 6,779,339 B1 * | 8/2004 | Laroo | F01N 13/011 60/287 |
| 7,770,386 B2 * | 8/2010 | Lowe | F01N 3/0814 60/287 |

(Continued)

OTHER PUBLICATIONS

SAE International—Sharp et al., "Further Advances in Demonstration of a Heavy-Duty Low NOX System for 2027 and Beyond", No. 2024-01-2129, ISSN 0148-7191, published Apr. 9, 2024 (14 pages).
(Continued)

*Primary Examiner* — Binh Q Tran
(74) *Attorney, Agent, or Firm* — KLINTWORTH & ROZENBLAT LLP

(57) ABSTRACT

A work vehicle having an engine that generates exhaust gases flowing through an exhaust flow path to an exhaust vent includes a nitrogen-oxide (NOx) reduction device, a particulate filter, a temperature sensor sensing a temperature associated with the exhaust gases, and a plurality of flow control devices in the exhaust flow path between the engine and the exhaust vent. The plurality of flow control devices are operable to define a first flow path when the sensed temperature is less than a predetermined temperature threshold and a second flow path otherwise. The NOx reduction device is upstream of the particulate filter relative to the exhaust flow path in the first flow path and the particulate filter is upstream of the NOx reduction device relative to the exhaust flow path in the second flow path.

20 Claims, 7 Drawing Sheets

(51) Int. Cl.
*F01N 3/031* (2006.01)
*F01N 3/035* (2006.01)
*F01N 3/28* (2006.01)
*F01N 13/08* (2010.01)

(52) U.S. Cl.
CPC ............ *F01N 3/031* (2013.01); *F01N 3/2053* (2013.01); *F01N 3/2093* (2013.01); *F01N 3/2892* (2013.01); *F01N 13/087* (2013.01); *F01N 2250/02* (2013.01); *F01N 2410/02* (2013.01); *F01N 2410/03* (2013.01); *F01N 2410/04* (2013.01); *F01N 2560/06* (2013.01); *F01N 2560/07* (2013.01); *F01N 2610/02* (2013.01); *F01N 2900/1411* (2013.01); *F01N 2900/1602* (2013.01)

(58) Field of Classification Search
CPC ..... F01N 2900/1404; F01N 2900/1411; F01N 2900/1602; F01N 2900/1606
See application file for complete search history.

(56) References Cited

U.S. PATENT DOCUMENTS

| | | | |
|---|---|---|---|
| 7,977,275 B2 | 7/2011 | Pfeifer et al. | |
| 8,800,268 B2 | 8/2014 | Voss et al. | |
| 8,932,546 B2 | 1/2015 | Frantz et al. | |
| 9,492,787 B2 | 11/2016 | Schuetze et al. | |
| 2004/0006977 A1* | 1/2004 | Nakatani | F01N 3/0885 60/288 |
| 2006/0283178 A1* | 12/2006 | Akagawa | B01D 53/9431 60/297 |
| 2012/0204542 A1* | 8/2012 | Norris | F01N 13/011 60/287 |
| 2018/0023450 A1* | 1/2018 | Zhang | F01N 3/023 60/602 |
| 2022/0290594 A1* | 9/2022 | Liu | F01N 3/2006 |

OTHER PUBLICATIONS

John Deere Power Systems—Aftertreatment Solutions in a Stage V Landscape, undated admitted prior art (3 pages).

* cited by examiner

WORK VEHICLE AND AFTERTREATMENT SYSTEM THEREFOR

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to internal combustion engine systems for work vehicles and an aftertreatment system for work vehicles.

BACKGROUND OF THE DISCLOSURE

Heavy-duty work vehicles, such as those used in the agricultural, construction, forestry, and mining industries, may utilize various propulsion systems and drive trains to provide tractive power to the ground-engaging wheels or tracks for travel and work operations of the work vehicle. Internal combustion engines, including various compression ignition engines (such as diesel engines), combust fuel to generate power for tractive and work operations of these work vehicles. Combustion of fuel generates harmful gases that are converted by an aftertreatment system into less harmful gases that can be exhausted from the work vehicle. For example, combustion of diesel fuel may generate hydrocarbons, carbon monoxide, oxides of nitrogen (NOx), and other gases that are converted by an aftertreatment system into carbon dioxide, nitrogen, and water vapor. The aftertreatment system includes one or more catalyst(s) that when heated to at least a predetermined temperature facilitates such conversion as gases produced by the engine system pass through the aftertreatment system. Fuel combustion may also generate particulate matter that is filtered by the aftertreatment system to prevent contamination of the one or more catalysts that convert exhaust gases by such particulate matter and/or discharge of the particulate matter from the work vehicle.

SUMMARY OF THE DISCLOSURE

The disclosure provides a work vehicle having an engine that generates exhaust gases flowing through an exhaust flow path to an exhaust vent. The work vehicle includes a nitrogen-oxide (NOx) reduction device, a particulate filter, and a temperature sensor sensing a temperature associated with the exhaust gases, and a plurality of flow control devices in the exhaust flow path between the engine and the exhaust vent. The plurality of flow control devices are operable to define a first flow path when the sensed temperature is less than a predetermined temperature threshold and a second flow path otherwise. The NOx reduction device is upstream of the particulate filter relative to the exhaust flow path in the first flow path and the particulate filter is upstream of the NOx reduction device relative to the exhaust flow path in the second flow path.

The present disclosure also provides an aftertreatment system for a work vehicle having an engine that generates exhaust gases flowing through an exhaust flow path to an exhaust vent. The aftertreatment system includes a nitrogen-oxide (NOx) reduction device, a particulate filter, a temperature sensor sensing a temperature associated with the exhaust gases, and a plurality of flow control devices in the exhaust flow path. The plurality of flow control devices are operable to define a first flow path between the engine and the exhaust vent when the sensed temperature is less than a predetermined temperature threshold and a second flow path between the engine and the exhaust vent otherwise. The NOx reduction device is upstream of the particulate filter in the first flow path and the particulate filter is upstream of the NOx reduction device in the second flow path.

In some aspects or embodiments, the particulate filter comprises a diesel oxidation catalyst and a diesel particulate filter or a catalyzed diesel particulate filter.

In other aspects or embodiments, the NOx reduction device is an ammonia based selective catalytic reduction device.

In other aspects or embodiments, the plurality of flow control devices are operated to define the first flow path when operation of the engine is to be terminated.

In other aspects or embodiments, the work vehicle and/or aftertreatment device further comprises a diesel exhaust fluid (DEF) injector, wherein the DEF injector injects DEF into the exhaust gases upstream of the particulate filter when the first flow path is defined and downstream of the particulate filter when the second flow path is defined.

In other aspects or embodiments, the plurality of flow control devices includes a first flow control device and a second flow control device. The first flow control device is operable to selectively couple an exhaust flow line from the engine to an input of the NOx reduction device or an input of the particulate filter and the second flow control device is operable to selectively couple an output of the NOx reduction device or an output of the particulate filter to the exhaust vent. Further, the first flow control device and the second flow control device are the only flow control devices operated to selectively change between the first flow path and the second flow path.

In other aspects or embodiments, the plurality of flow control devices includes a first flow control device and a second flow control device and when the plurality of flow control devices define the first flow path: (1) the first flow control device fluidly couples a first input flow line that receives the exhaust gases from the engine and a second input flow line of the NOx reduction device and decouples the first input flow line and a third input flow line of the particulate filter, and (2) the second flow control device fluidly couples an output flow line of the NOx reduction device and the third input flow line of the particulate filter and fluidly decouples the output flow line of the NOx reduction device and the exhaust vent. Further, the first flow control device and the second flow control device are multiport valves.

In other aspects or embodiments, the work vehicle and/or aftertreatment system comprises only one NOx reduction device disposed in the exhaust flow path.

In other aspects or embodiments, the work vehicle or aftertreatment system includes a controller having a processing and memory architecture and configured to execute instructions to monitor the temperature sensor when the plurality of flow control devices define the first flow path, determine when the sensed temperature is greater than the predetermined temperature, and in response operate the plurality flow control devices to define the second flow path.

The details of one or more embodiments are set forth in the accompanying drawings and the description below.

Other features and advantages will become apparent from the description, the drawings, and the claims.

BRIEF DESCRIPTION OF THE DRAWINGS

FIG. 3A is a block diagram of a computer-based device that may implement the components of the control system of FIG. 3;

Like reference symbols in the various drawings indicate like elements.

DETAILED DESCRIPTION

Figure 1:
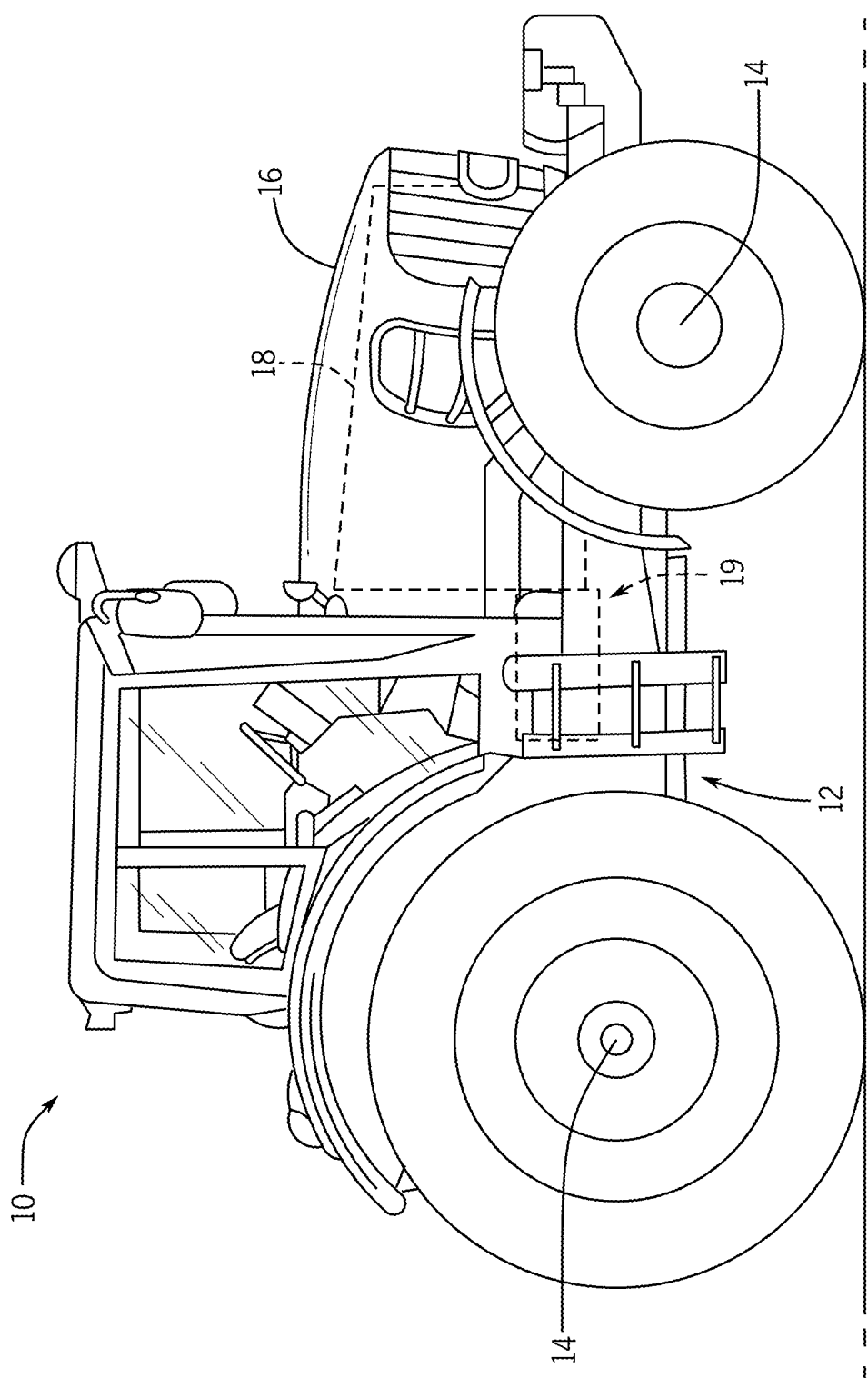
FIG. 1 is an example work vehicle in the form of an agricultural tractor in which the aftertreatment system of the present disclosure may be incorporated.

The following describes one or more example embodiments of the disclosed aftertreatment system for a work vehicle as shown in the accompanying figures of the drawings described briefly above. Various modifications to the example embodiments may be contemplated by one of skill in the art. Discussion herein focuses on the aftertreatment system being for a work vehicle, such as an agricultural tractor, but the aftertreatment system disclosed herein may be utilized in other contexts, including other work vehicle platforms in the agriculture, construction, forestry, mining, and other industries.

Overview

Fuel is combusted by an engine of a work vehicle to generate power necessary to undertake various work operations of the work vehicle such as to transport the work vehicle, transport a load carried by the work vehicle, operate electrical and mechanical auxiliary devices of the work vehicle including various work implements, and the like. Combustion of the fuel by the engine results in exhaust particulates such as soot and gases such as hydrocarbons and oxides of nitrogen (NOx). Such exhaust gases pass through the aftertreatment system that treats the exhaust gases as described herein before being discharged through an exhaust vent of the work vehicle.

The aftertreatment system may include a diesel oxidation catalyst (DOC) that facilitates an oxidation reaction to convert hydrocarbons and carbon monoxide in the exhaust gases into carbon dioxide and water vapor, a particulate filter that entraps particulate matter in the exhaust, an NOx reduction device that facilitates conversion of NOx in the exhaust into nitrogen and water vapor, and an ammonia oxidation catalyst (AOC) that oxidizes ammonia into nitrogen and water vapor. In some systems, a diesel exhaust fluid (DEF), e.g., a fluid comprising ammonia and/or urea, may be added to the exhaust gases before such gases pass through the NOx reduction device. The DEF decomposes into ammonia and carbon dioxide in the exhaust gases and the ammonia is used in the reduction of NOx in NOx reduction device. Any ammonia that is not consumed during the reduction of the NOx is oxidized by the AOC into nitrogen and water.

In some embodiments, the NOx reduction device includes a catalyst, such a selective catalytic reduction (SCR) catalyst that is typically inactive until it has been heated to at least a temperature threshold necessary to initiate catalysis. Such temperature threshold is conventionally referred to as a "light-off" temperature. Typically, heat from the exhaust gases passing through the NOx reduction device facilitates heating the catalyst of such device. In a conventional aftertreatment system, exhaust gases generated by the engine system are first passed through the DOC and then in order the particulate filter, the NOx reduction device, and the AOC. This configuration has advantages in that oxidation of the hydrocarbons by the DOC comprises an exothermic reaction that further heats the exhaust gases and such heated exhaust gases facilitate burning off of particulate matter accumulated in the particulate filter and/or supply thermal energy that may be used to heat the catalyst of the NOx reduction device to the light-off temperature. Further, having the exhaust gases filtered by the particulate filter before such gases pass through the NOx reduction device removes particulate matter that could contaminate the components of the NOx reduction device and thereby reduce the effectiveness and/or durability thereof. In addition, the particulate filter traps ash particles that may be generated by combustion of any engine lubricant so that such ash particles do not negatively impact performance of the NOx device.

However, when the engine is initially ignited or when the engine is operating with a low load, the operation of the engine may not produce exhaust gases with sufficient thermal energy to effectively heat the catalyst of the NOx reduction device to the light-off temperature and/or produce exhaust gases with enough hydrocarbons so that the exothermic reactions in in the DOC heat the exhaust gases to a temperature necessary to activate the catalyst of the NOx reduction device. Further, the DOC and particulate filters are thermal masses that draw heat from the exhaust gases as such gases pass therethrough and reduce the amount of heat available in the exhaust gases to heat the catalyst of the NOx reduction device.

Some aftertreatment systems address these problems by including an additional NOx reduction device through which the exhaust gases pass before entering the DOC. However, as would be understood by one having ordinary skill in the art, having two NOx reduction devices increases the cost and space requirements of the aftertreatment system. Further, the additional NOx reduction device that precedes the DOC is continuously exposed to particulate matter and ash during the operation of the engine that reduces the effectiveness and/or durability thereof.

Disclosed herein is an aftertreatment system in which the exhaust flow path between the engine and the exhaust vent of the work vehicle is modified in accordance with the temperature of the exhaust gases to facilitate rapid heating of the catalyst in the NOx reduction device. Specifically, the exhaust gases generated by the engine follow a first flow path when a temperature associated with the exhaust gases generated by the engine is below a predetermined temperature threshold (e.g., when the engine is initially ignited or is operating at a low load) and a second flow path when the temperature of the exhaust exceeds the predetermined temperature threshold. In the first flow path, the exhaust gases pass through the NOx reduction device before passing through the DOC and particulate filter so that the thermal masses of the DOC and the particulate filter do not draw heat from the exhaust gases and all of the thermal energy of the exhaust gases may be used to raise the temperature of the catalyst of the NOx reduction device to the light-off temperature. In the second flow path, the exhaust gases pass through the particulate filter to remove particulate matter from the exhaust gases that may damage the NOx reduction device before the exhaust gases pass therethrough. As described in greater detail below, an aftertreatment control system monitors a temperature associated with the exhaust gases, determines whether the exhaust generated by the engine should follow the first or the second exhaust flow path in accordance with such temperature, and operates flow control devices of the aftertreatment system to define the exhaust flow path.

In some embodiments, the DOC, the particulate filter, the NOx reduction device, and the AOC are packaged or mounted in separate housings (or cannisters). In other embodiments, the DOC and particulate filter are contained in a first housing and the NOx reduction device and the AOC are contained in a second housing. Further, in some embodiments, the particulate filter may be a diesel particulate filter (DPF) separate from the DOC. In other embodiments, the particulate filter may be integrated with a catalyst into an integrated component that filters particulate matter and oxidizes hydrocarbons and carbon monoxide, such as, for example a catalyzed diesel particulate filter (cDPF), a diesel oxidation catalyst filter (DOCF), and the like. It should be apparent to one who has ordinary skill in the art that in embodiments in which functionality of the DOC is integrated into the particulate filter, a separate DOC is not necessary in the aftertreatment system.

These and further aspects of the disclosed aftertreatment control system will be better understood with regard to the one or more examples described hereinafter.

Example Aftertreatment Systems

Referring to FIG. 1, a work vehicle 10 is shown that can implement embodiments of the disclosure. In the illustrated example, the work vehicle 10 is depicted as an agricultural tractor. It will be understood, however, that other configurations may be possible, including configurations with the work vehicle 10 as a different kind of tractor, a harvester, a log skidder, a grader, or one of various other work vehicle platforms. The work vehicle 10 includes a frame or chassis 12 carried on front and rear wheels 14. Positioned on a forward end region of the chassis 12 is an engine housing 16 within which is located an engine system 18. The engine system 18 provides power via an associated powertrain 19 to an output member (e.g., an output shaft, not shown) that, in turn, transmits power to axle(s) of the work vehicle 10 to provide propulsion thereto and/or to a power take-off shaft for powering an implement on or associated with the work vehicle 10.

Figure 2:
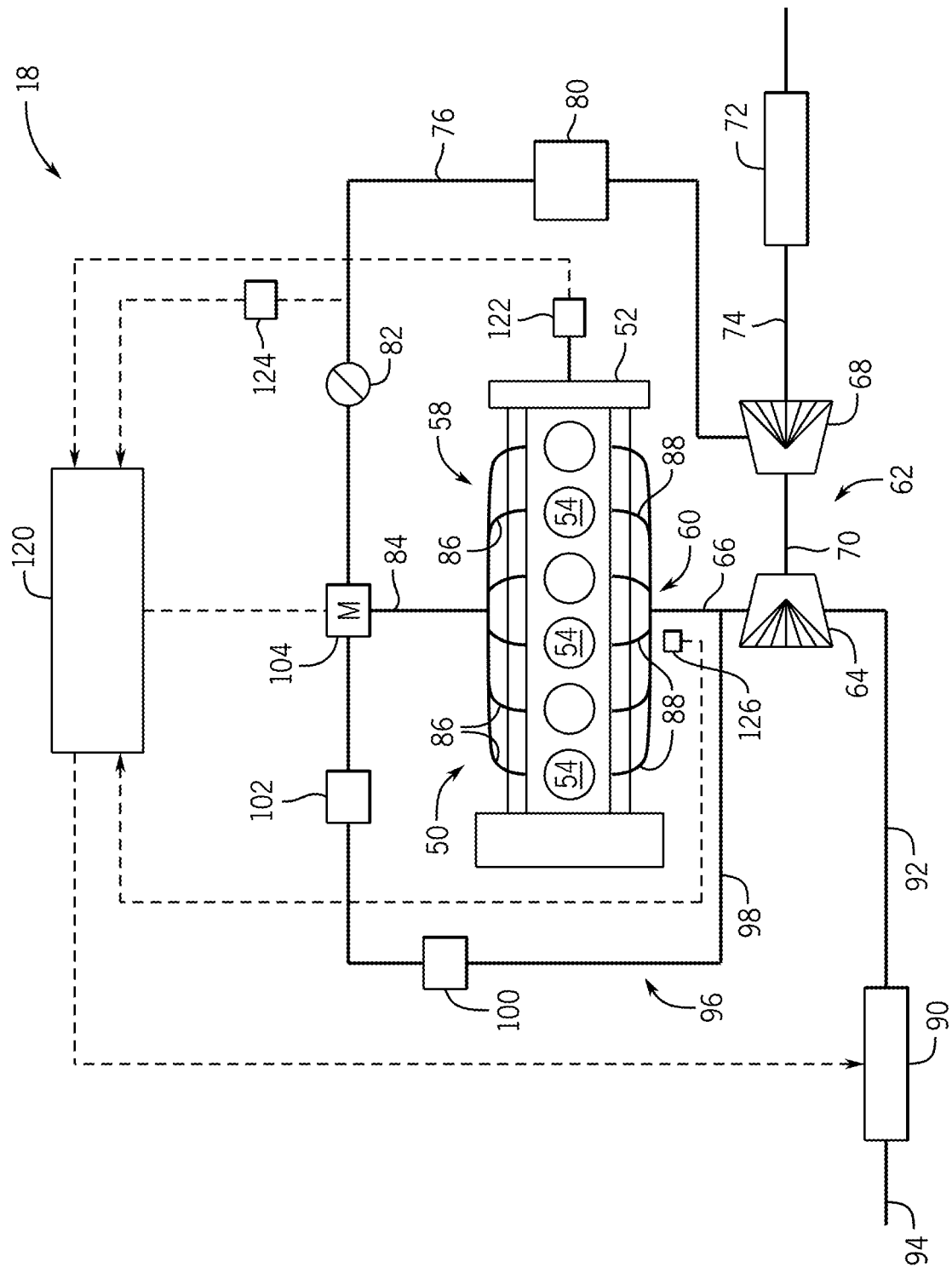
FIG. 2 is a schematic diagram of an example engine system of the work vehicle of FIG. 1.

The engine system 18 is illustrated in greater detail in FIG. 2 in accordance with an example implementation. Referring to FIG. 2, the engine system 18 includes an internal combustion engine 50 (hereafter, "engine") that, in the present embodiment is a compression-ignition internal combustion engine. The engine 50 of the engine system 18 includes an engine block 52 having a plurality of piston-cylinder arrangements 54. The plurality of piston-cylinder arrangements 54 operate to cause combustion events and thereby generate power necessary to operate the work vehicle 10. In the illustrated implementation, the engine 50 is an inline-6 (I-6) engine defining six piston-cylinder arrangements 54; however, in alternative implementations various engine styles and layouts may be used.

The engine system 18 also includes an intake manifold 58 fluidly connected to the engine 50, an exhaust manifold 60 fluidly connected to the engine 50, and a turbocharger assembly 62. The turbocharger assembly 62 includes a turbine 64 fluidly connected to the exhaust manifold 60 by an exhaust gas passageway 66 and a compressor 68 mechanically coupled to the turbine 64 via a rotatable shaft 70. The compressor 68 is fluidly connected to an air intake 72 that may include one or more intake components (e.g., an air filter, an air cooler, etc.) disposed in an air intake passageway 74. During operation of the engine 50, exhaust gases generated by the engine 50 pass through the exhaust gas passageway 66 and through the turbine 64 to cause the turbine 64 (and the rotatable shaft 70) to rotate. Rotation of the rotatable shaft 70 in turn causes the compressor 68 to rotate and draw fresh air through the air intake 72, through the air intake passageway 74, through the compressor 68, and into the intake manifold 58 via a charge air passageway 76. Operation of the turbocharger assembly 62 in this manner increases the flow rate of air into the intake manifold 58 above what it would otherwise be without the turbocharger assembly 62 and thus the turbocharger assembly 62 supplies so-called "charge" air to the engine 50. In some embodiments, a charge air cooler (i.e., an aftercooler) 80 is disposed in the charge air passageway 76 to cool the charge air. The charge air cooler 80 reduces the temperature of the charge air to increase the unit mass per unit volume (i.e., density) of the charge air prior to such charge air being provided to the engine 50 for improved volumetric efficiency thereof. An air intake throttle 82 is also disposed in the charge air passageway 76 and regulates a rate at which charge air is supplied to the intake manifold 58. The compressed charged air allowed to flow through the air intake throttle flows through a main intake 84 of the intake manifold 58.

The main intake 84 of the intake manifold 58 is coupled to a plurality of secondary pipes 86 of the intake manifold 58 and each of the secondary pipes 86 is in fluid communication with a corresponding piston-cylinder arrangement 54 to direct a supply of charge air thereto.

The exhaust manifold 60 of the engine system 18 includes a plurality of secondary pipes 88, each of which is in fluid communication with a corresponding piston-cylinder arrangement 54. The plurality of secondary pipes 88 direct the exhaust gases generated by the engine 50 to the exhaust gas passageway 66 of the exhaust manifold 60. As described above, the exhaust gas passageway 66 of the exhaust manifold 60 is fluidly coupled to and causes rotation of the turbine 64 of the turbocharger assembly 62 and thereby causes more ambient air to be drawn into the air intake passageway 74.

A first portion of the exhaust gases in the exhaust gas passageway 66 then exits the turbine 64 and into an aftertreatment system 90 via an aftertreatment passageway 92. The aftertreatment system 90 treats the exhaust gases prior to the treated exhaust gases being vented to the ambient environment via an exhaust outlet or exhaust vent 94 of the work vehicle 10. A second portion of the exhaust gases in the exhaust gas passageway 66 may be directed to an exhaust recirculation (EGR) system 96 that includes an EGR passageway 98, an EGR cooler 100 disposed in the EGR passageway 98, and an EGR valve 102. Operation of the EGR valve 102 draws the second portion of the exhaust gases from the exhaust gas passageway 66 through EGR passageway 98, through the EGR cooler 100, through the EGR valve 102, and into a mixer 104. Operation of the EGR valve 102 may be varied to determine the second portion of the of the exhaust gases in the exhaust gas passageway 66 that is drawn into the EGR system 96. The EGR cooler 100 cools the exhaust gases that flow through the EGR passageway 98 before such gases are supplied to the mixer 104. The second portion of the exhaust gases and the charge air drawn through the air intake passageway 74 combine in the mixer 104 before flowing into the main intake 84 of the intake manifold 58. The EGR system 96 functions to recirculate a portion of the exhaust gases generated by the engine 50 and thereby reduce the formation of oxides of nitrogen (NOx) during combustion.

Figure 3:
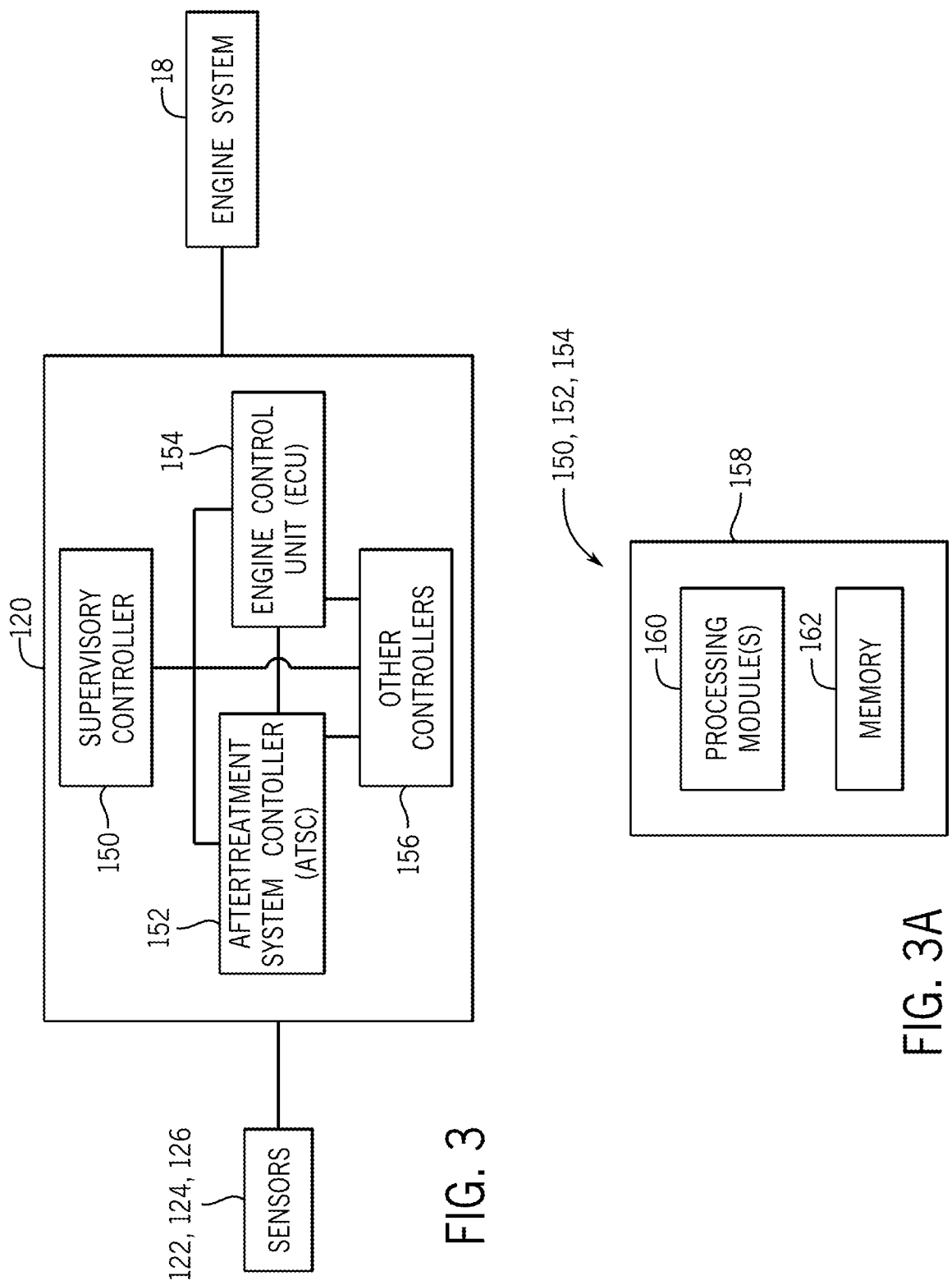
FIG. 3 is a block diagram of a control system of the engine system of FIG. 2.

Referring to FIGS. 2 and 3, the engine system 18 includes a control system 120 and various sensors including: an engine speed sensor 122; one or more sensor(s) 124 disposed in the intake manifold 58 or the air intake 72 that measure one or more of mass airflow, air temperature, and air pressure in the intake manifold 58 and/or air intake 72; and one or more sensor(s) 126 in the exhaust manifold 60, the exhaust gas passageway 66, the aftertreatment system 90, and/or the aftertreatment passageway that measures any or all of an oxygen level, temperature, and pressure of exhaust generated by the engine 50.

The control system 120 monitors signals or data received from the sensors 122, 124, and 126 described above and adjusts operation of the engine system 18 to ensure the work vehicle 10 is able to meet the demands placed on the work vehicle 10 by an operator while managing fuel efficiency and reduction of hazardous exhaust gases released to the ambient environment. In particular, the control system 120 includes a supervisory controller 150, an aftertreatment system controller (ATSC) 152 that manages flow of the exhaust gases generated by the engine 50 through the aftertreatment system 90, and an electronic control unit (ECU) 154 that optimizes operation of the engine 50. The control system 120 may also include one or more additional controller(s) 156 such as an operator interface controller, a climate control system, a traction system controller, an accessory and/or hydraulic system controller, a work implement controller, and various others.

The supervisory controller 150 initiates operation of the ATSC 152, the ECU 154, and the additional controllers 156 when the work vehicle 10 is started by the operator (e.g., when the operator of the work vehicle 10 actuates an ignition of the work vehicle 10), monitors operation of such controllers 152, 154, and 156 during operation of the work vehicle 10, and shuts down such controllers 152, 154, and 156 when the operator turns off the work vehicle 10. The supervisory controller 150, the ATSC 152, the ECU 154, and the additional controllers 156 exchange signals and/or data therebetween as necessary to maintain efficient and clean operation of the engine system 18 (and thereby the work vehicle 10).

Referring also to FIG. 3A, the supervisory controller 150, the ATSC 152, the ECU 154, and the additional controllers 156 may be implemented using hardware, software, firmware, or combinations thereof. In the illustrated embodiment, such components 150, 152, 154, and 156 of the control system 120 may be implemented by one or more suitably programmed computer-based device(s) 158, some or each having one or more processing device(s) 160 and one or more memory device(s) 162. The one or more memory device(s) 162 has stored therein, among other things, programming instructions executed by one or more processing device(s) 160 to cause the controllers 150, 152, 154, and 156 to undertake functions of the engine system as described herein.

Each computer-based device 158 may comprise, e.g., a computer, a device using one or more application specific integrated circuits (ASIC's) and/or field-programmable gate arrays (FPGA's), and/or combinations thereof. Such device 158 may be unitary or may be distributed multiple computing devices, and one or more such computing devices may be installed locally on or remote from the work vehicle 10. Each computer-based device 158 may communicate with another computing device over one or more network(s) such as a local area network (LAN), a control area network (CAN), a cellular network, a wide area network (WAN) such as the Internet, and the like. One or more components 150, 152, 154, and 156 of the control system 120 also may be coupled to and responsive to one or more user device(s) (not shown) such as a keyboard, a mouse, a display, a touchscreen, a joystick, etc. (not shown) via which an operator may monitor and direct operation of the work vehicle 10.

Figure 4:
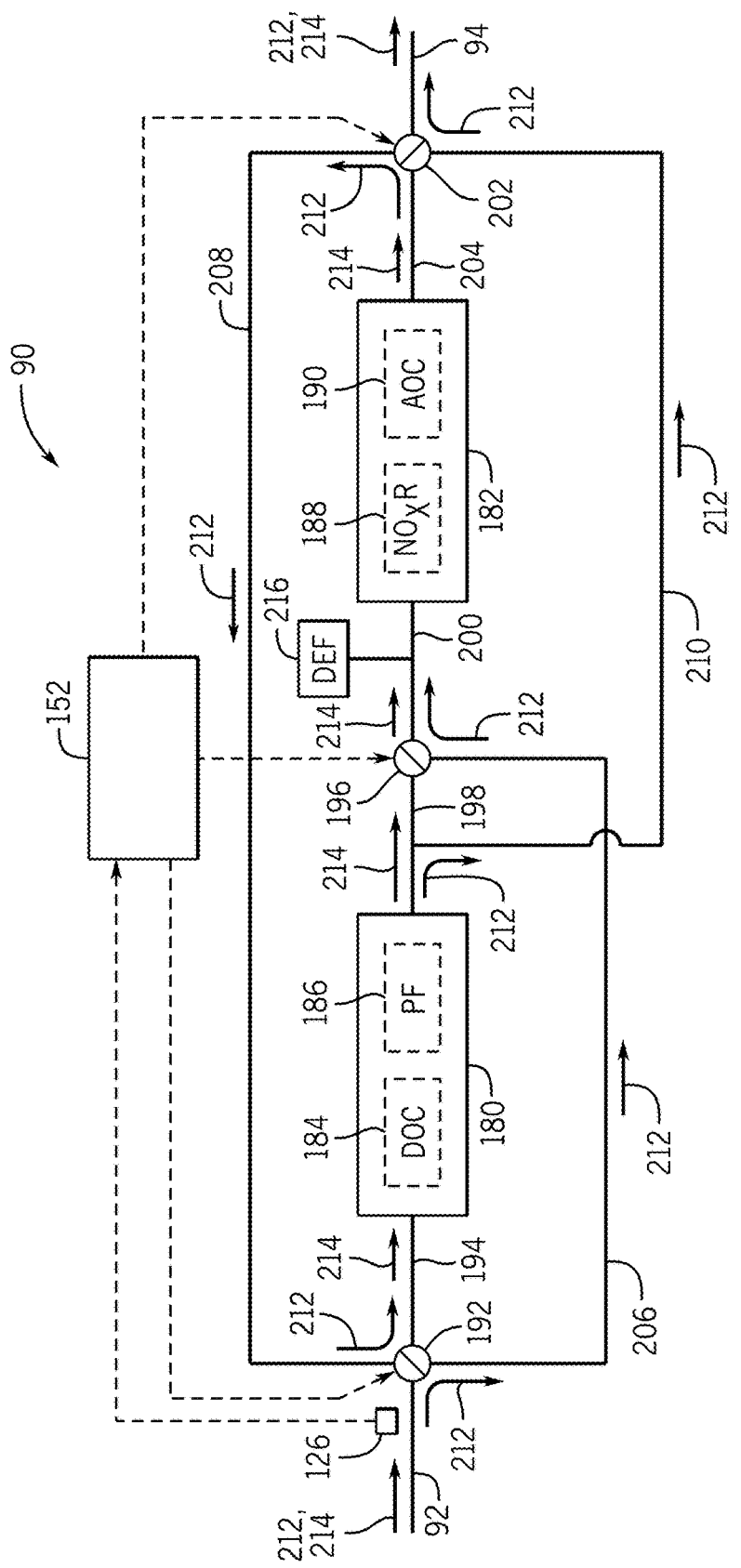
FIG. 4 is a schematic diagram of an aftertreatment system of the engine system of FIG. 2.
Figure 4A:
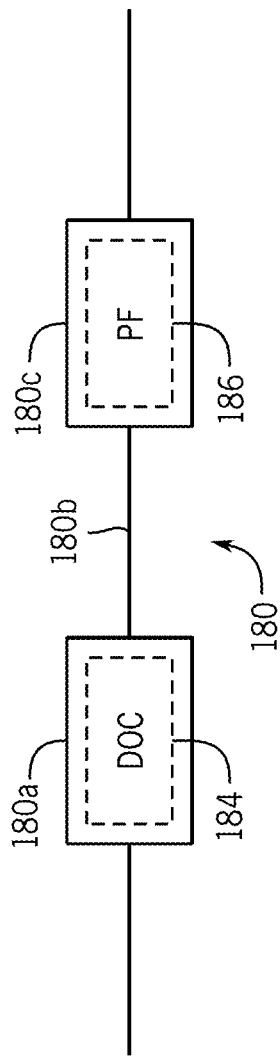
FIG. 4A is a schematic diagram of a diesel oxidation catalyst and a particulate filter that may be used in the aftertreatment system of FIG. 4.
Figure 4B:
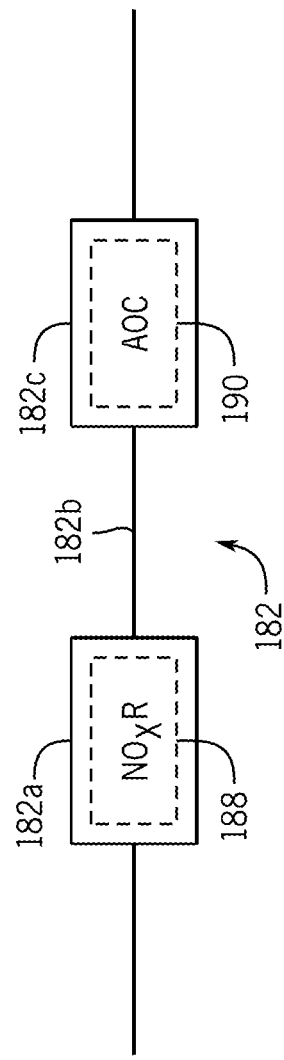
FIG. 4B is a schematic diagram of a nitrogen oxides catalyst and an ammonia oxidation catalyst that may be used the aftertreatment system of FIG. 4.

As discussed above, the ATSC 152 selectively determines a flow path of the exhaust between the engine 50 and exhaust vent 94 in accordance with the temperature associated with the exhaust gases as measured by the one or more sensors 126. Referring to FIGS. 4, 4A, and 4B, in one embodiment, the aftertreatment system 90 includes a particulate filter housing 180 and an NOx reduction device housing 182. A DOC 184 and a particulate filter 186 are disposed in the particulate filter housing 180. In some embodiments, the DOC 184 and the particulate filter 186 may be separate components disposed in the particulate filter housing 180 or functionality of the DOC 184 may be integrated with that of particulate filter 186 (e.g., if the particulate filter 186 is a cDPF, a DOCF, and the like) into a single component disposed in the particulate filter housing 180. In other embodiments, for example the embodiment shown in FIG. 4A, instead of a single particulate filter housing 180, the aftertreatment system 90 may comprise a first housing 180a in which the DOC 184 is disposed that is fluidly coupled by a fluid line 180b to a second housing 180c in which the particulate filter 186 is disposed. References herein to the particulate filter housing 180 may refer to the embodiment shown in FIG. 4 in which the particulate filter housing 180 comprises a single housing in which both the DOC 184 and the particulate filter 186 are disposed or a single unit in which the particulate filter 186 having the functionality of the DOC integrated therein is disposed. Alternately, such references may refer to the embodiment shown in FIG. 4A that comprises separate housings 180a and 180c having the DOC 184 and the particulate filter 186, respectively, disposed therein.

In some embodiments, an NOx reduction device 188 and an AOC 190 are disposed in the NOx reduction device housing 182 as shown in FIG. 4. In other embodiments, the NOx reduction device housing 182 comprises a third housing 182a coupled by a fluid line 182b to a fourth housing 182c as shown in FIG. 4B, wherein the NOx reduction device 188 is disposed in the third housing 182a and the AOC 190 is disposed in the fourth housing 182c. References herein to the NOx reduction device housing 182 contemplate both the embodiment shown in FIG. 4 in which the NOx reduction device housing 182 comprises a single unit in which both the NOx reduction device 188 and the AOC 190 are disposed and the embodiment shown in FIG. 4B that comprises separate third and fourth housings 182*a* and 182*c* having the NOx reduction device 188 and the AOC 190, respectively disposed therein.

The aftertreatment system 90 shown in FIG. 4 includes a first flow control device 192 disposed between the aftertreatment passageway 92 and a particulate filter housing input line 194, a second flow control device 196 disposed between a particulate filter housing output line 198 and a NOx reduction device housing input line 200, and a third flow control device 202 disposed between a NOx reduction device housing output line 204 and the exhaust vent 94. In addition, a first bypass line 206 fluidly couples the aftertreatment passageway 92 and the NOx reduction device housing input line 200 via the flow control devices 192 and 196, a second bypass line 208 fluidly couples the NOx reduction device housing output line 204 and the particulate filter housing input line 194 via the flow control devices 192 and 202, and a third bypass line 210 fluidly couples the particulate filter housing output line 198 and the exhaust vent 94 via the flow control device 202.

Flow control devices (e.g., multi-port valves and the like) selectively operable to fluidly couple one or more input flow lines to one or more output flow lines apparent to one who has ordinary skill in the art may be used to provide the first through third flow control devices 192, 196, and 202. The ATSC 152 monitors a temperature associated with the exhaust gases sensed by the one or more temperature sensor(s) 126. When the temperature associated with the exhaust gases is less than the predetermined temperature threshold described above, the ATSC 152 operates the first flow control device 192 to fluidly couple the aftertreatment passageway 92 and the first bypass line 206 and fluidly couple the second bypass line 208 and the particulate filter housing input line 194, the second flow control device 196 to fluidly couple the first bypass line 206 and the NOx reduction device housing input line 200, and the third flow control device 202 to fluidly couple NOx reduction device housing output line 204 and the second bypass line 208 and fluidly couple the third bypass line 210 and the exhaust vent 94. Further, the ATSC 152 operates the second flow control device 196 to fluidly decouple the particulate filter housing output line 198 and the NOx reduction device housing input line 200 to cause exhaust to flow from particulate filter housing output line 198 into the third bypass line 210. The ATSC 152 operates the first through third flow control devices 192,196, and 202 in this manner to cause the exhaust gases to flow along a first flow path shown by arrows 212 from the aftertreatment passageway 92, through the aftertreatment system 90, and to the exhaust vent 94.

When the temperature of the exhaust gases is at least the predetermined temperature threshold, the ATSC 152 operates the first through third flow control devices 192, 196, and 202 to fluidly couple the aftertreatment passageway 92 and the particulate filter housing input line 194, the particulate filter housing output line 198 and the NOx reduction device housing input line 200, and the NOx reduction device housing output line 204 to the exhaust vent 92, respectively. Further, the ATSC 152 operates the first through third flow control devices 192, 196, and 202, as necessary, to remove the first through third bypass lines 206, 208, and 210 from the exhaust flow path. Thus, ATSC 152 causes the exhaust gases to flow along a second flow path shown by arrows 214 from the aftertreatment passageway 92, through the aftertreatment system 90, and to the exhaust vent 94. The predetermined temperature threshold is selected in accordance with characteristics of the catalyst materials used in the NOx reduction device. In some embodiments the predetermined temperature threshold is approximately 300 degrees Celsius.

Specifically, when the ATSC 152 operates the first through third flow control devices 192, 196, and 202 to define the first flow path shown by the arrows 212, the first flow control device 192 causes the exhaust gases to flow from the aftertreatment passageway 92 into the first bypass line 206. The exhaust gases then flow through the first bypass line 206, into the NOx reduction device housing input line 200, and into the NOx reduction device housing 182. The exhaust gases are processed by the NOx reduction device 188 and the AOC 190 as such exhaust gases flow through the NOx device housing 182 and thereafter exit the NOx reduction device housing 182 and flow into the NOx reduction device housing output line 204. The third flow control device then directs the exhaust gases in the NOx reduction device housing output line 204 to flow into the second bypass line 208, through the particulate filter housing input line 194, and into particulate filter housing 180. As the exhaust gases pass through the particulate filter housing 180, such exhaust gases are processed by the DOC 184, filtered by the particulate filter 186, and exit the particulate filter housing 180 through the particulate filter housing output line 198. The second flow control device 196 blocks passage of the exhaust gases from the particulate filter housing output line 198 into the NOx reduction device housing input line 200 and causes such exhaust gases to flow into the third bypass line 210, which carries the exhaust gases to the exhaust vent 94.

When the ATSC 152 operates the first through third flow control devices 192, 196, and 202 to all be in the open position and thus define the second flow path shown by the arrows 214, the exhaust gases from the engine 50 that flow into the aftertreatment passageway 92 and pass in order through the first flow control device 192, through the particulate filter housing input line 194, through the particulate filter housing 180 to be processed by the DOC 184 and filtered by the particulate filter 186 and into the particulate filter housing output line 198. From the particulate filter housing output line 198, the exhaust gases pass through the second flow control device 196, through the NOx reduction device housing input line 200, through the NOx reduction device housing 182 to be processed by the NOx reduction device 188 and the AOC 190, through the NOx reduction device housing output line 204, through the third flow control device 202, and through the exhaust vent 94 to be vented from the work vehicle 10.

In some embodiments of the aftertreatment system, a diesel exhaust fluid injector 216 may be disposed in the NOx reduction device housing input line 200 that injects DEF into the exhaust gases supplied to such input line 200 through the second flow control valve 196 or the first bypass line 206. As would be understood by one having ordinary skill in the art, such injection of DEF into the exhaust gases facilitates operation of the NOx reduction device 188 to convert NOx in the exhaust gases into nitrogen and water. In some embodiments, the ATSC 152 monitors the temperature associated with the exhaust gases as sensed by the one or more sensors 126 and operates the DEF injector 216 to introduce DEF into the exhaust gases when such sensed temperature exceeds a predetermined DEF temperature, for example 200 degrees Celsius. Further, hydrocarbons (e.g., fuel) may be injected in the exhaust gases that enter the particulate filter housing 180 to improve operation of the DOC 184 and increase the thermal energy generated thereby. Such hydrocarbons may be injected into the exhaust by an injector disposed in the particulate filter housing input line 194 or in the flow path between the engine 50 and the particulate filter housing input line 194 and/or by operating the engine 50 so un-combusted fuel remains in the exhaust gases generated thereby. Further, in some cases, if the ATSC 152 detects that excess soot has accumulated on the particulate filter 186 when the exhaust gases are following the second flow path, the ATSC 152 may direct the ECU 154 or another component of the control system 120 to post-inject additional fuel during an expansion stroke of at least one cylinder-piston arrangement 54 to enable active regeneration of the particulate filter 186.

As discussed above, some of the one or more sensors 126 may be disposed in the aftertreatment system 90. In these cases, one or more such sensors 126 may be disposed at various portions of the exhaust flow path through the aftertreatment system including before the DOC 184, after the DOC 186, before and proximate the NOx reduction device 188, following the AOC 190, and the like. In some embodiments, the ATSC 152 monitors at least a temperature sensor 126 before and proximate the NOx reduction device 188. In other embodiments, the ATSC 152 monitors any, some, or all such sensors 126 (including those disposed in parts of the engine system 18 other than the aftertreatment device 90) to select the flow path followed by the exhaust gases.

Figure 5:
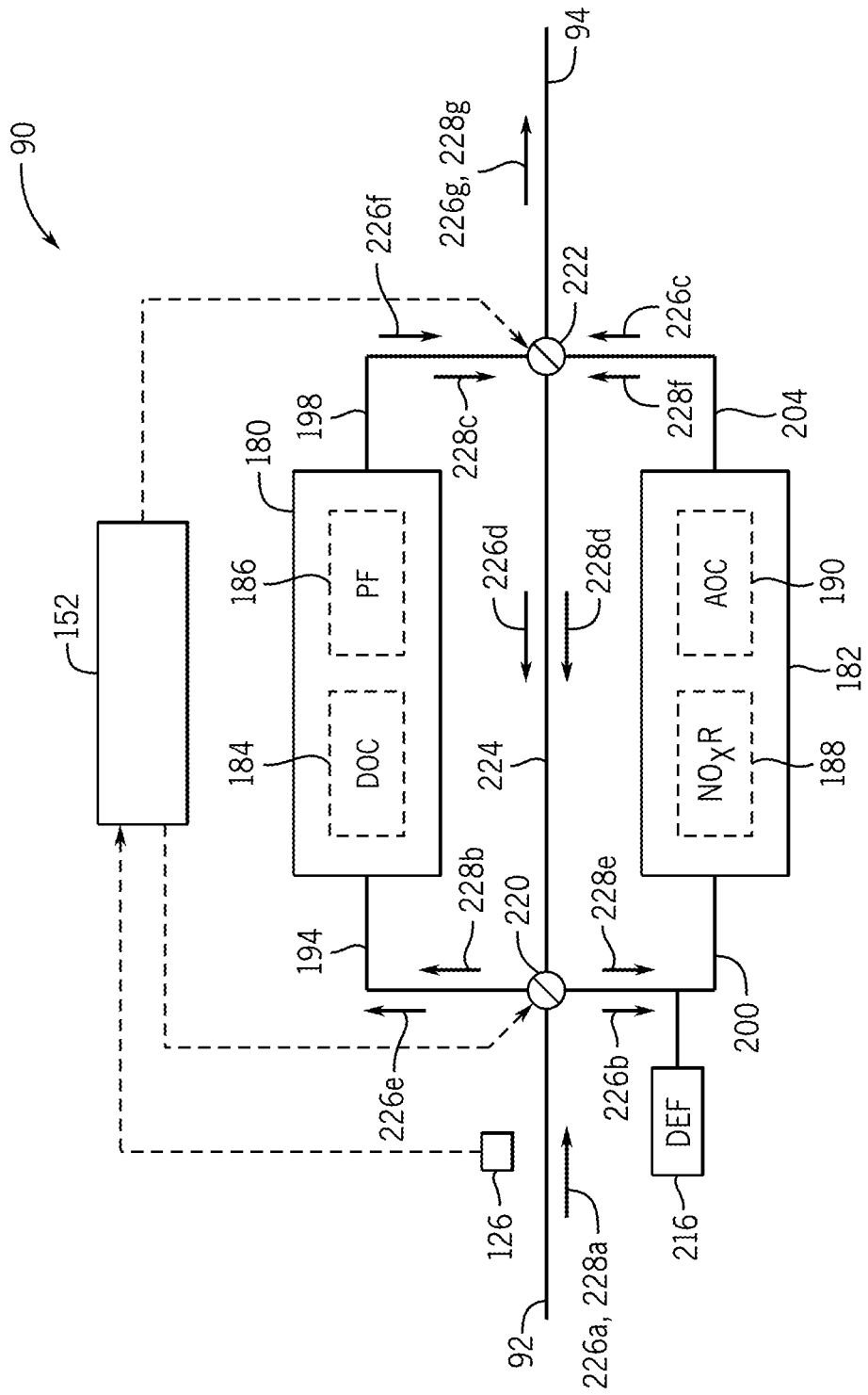
FIG. 5 is a schematic diagram of another aftertreatment system of the engine system of FIG. 2.

The number of flow control devices and bypass flow lines necessary in the aftertreatment system 90 to define the first and second flow paths described above may be reduced by using certain flow devices, e.g., multiport valves and the like, that are operable to selectively fluidly couples one or more input ports with one or more corresponding output ports. Referring to FIG. 5, another embodiment of the aftertreatment system 90 includes first and second flow control devices 220 and 222, respectively, and an intermediate flow line 224 that is fluidly coupled to the first and second flow control devices 220 and 222. To define the first flow path shown by the arrows 226, the ATSC 152 operates the first flow control device 220 to direct the exhaust gases to flow from the aftertreatment passageway 92 into the NOx reduction device housing input line 200 and to flow from the intermediate flow line 224 into the particulate filter housing input line 194. In addition, the ATSC 152 operates the second flow control device 222 to direct the exhaust gases to flow from the NOx reduction device housing output line 204 into the intermediate flow line 224 and from the particulate filter housing output line 198 to the exhaust vent 94. Thus, when the first flow path of the exhaust gases is defined, the exhaust gases follow in order a path shown by arrows 226a through 226g between the aftertreatment passageway 92 and the exhaust vent 94 and pass through the NOx reduction device housing 182 to be processed by the NOx reduction device 188 and the AOC 190 before being passed through the particulate filter housing 180 to be processed by the DOC 184 and filtered by the particulate filter 186.

To define the second flow path, the ATSC 152 operates the first flow control device 220 to direct the exhaust gases from the aftertreatment passageway 92 into the particulate filter housing input line 194 and from the intermediate flow line 224 into the NOx reduction device housing input line 200. The ATSC 152 further operates the second flow control device 222 to direct the exhaust gases from the particulate filter housing output line 198 to the intermediate flow line 224 and from the NOx reduction device housing output line 204 to the exhaust vent 94. Thus, the ATSC 152 defines the second flow path in which the exhaust gases flow from the aftertreatment passageway 92 to the exhaust vent 94 along a path shown by the arrows 228a through 228g in order and pass through the particulate filter housing 180 before passing through the NOx reduction device housing 182. The DEF injector 216 may be disposed in the NOx reduction device input line 220 and operated to inject DEF in the exhaust gases and/or a hydrocarbon injector may be disposed in a flow path between the engine 50 and the particulate filter housing 180 and operated to inject hydrocarbons in the exhaust gases as described above.

Figure 6:
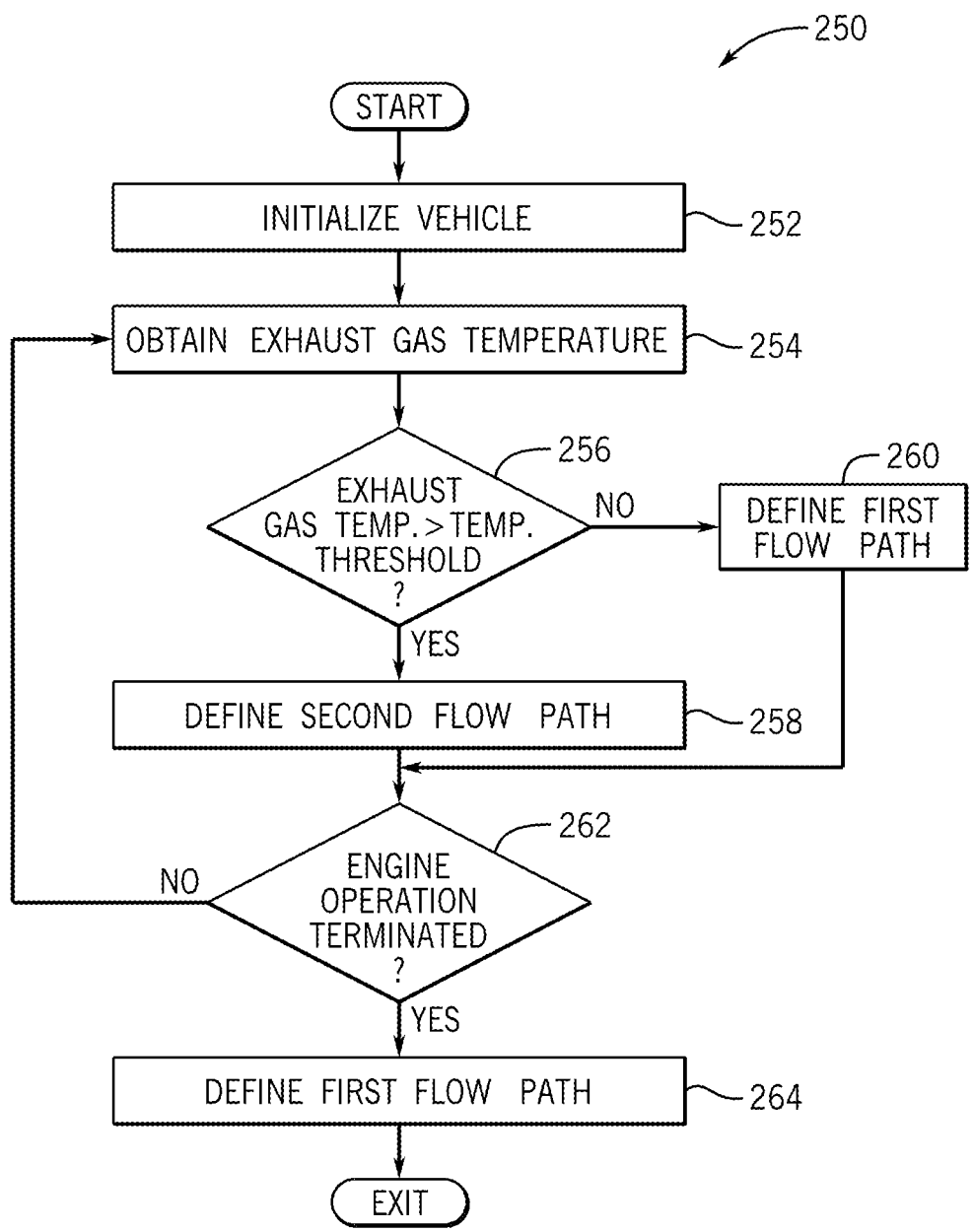
FIG. 6 is a flowchart of steps undertaken by an aftertreatment control system to operate the aftertreatment systems of FIGS. 4 and 5.

FIG. 6 is a flowchart 250 of steps undertaken by the ATSC 152 to define the flow paths taken by the exhaust gases through the aftertreatment system 90 as described above. At step 252, the ATSC 152 receives a signal and/or data from the supervisory controller 150 that the operator has turned on the work vehicle 10 and the engine 50 has been ignited. At step 254, the ATSC 152 obtains from the one or more sensors 126 a temperature associated with the exhaust gases being generated by the engine 50. In some embodiments, the ATSC 152 receives a signal and/or data from at least one sensor 126 of the one or more sensors 126 disposed within the exhaust manifold 60, the exhaust gas passageway 66, the aftertreatment passageway 92, and/or another component through which the exhaust gases flow and such sensor 126 directly measures a temperature associated with the exhaust gases as such gases pass thereby.

At step 256, the ATSC 152 checks if the temperature of the exhaust gases is greater than the predetermined temperature threshold described above and if so proceeds to step 258, otherwise the ATSC 152 proceeds to step 260.

At step 258, the ATSC 152 operates the flow control devices 192, 196, and 202 (FIG. 4) or the flow control devices 220 and 222 (FIG. 5) so that the exhaust gases from the engine 50 follow the second flow path through the aftertreatment system 90 in which the NOx reduction device 188 is downstream of the particulate filter 186 relative to such flow path. Thereafter, the ATSC 152 proceeds to step 262.

At step 260 (i.e., the exhaust gas temperature is less than or equal to the predetermined temperature threshold), the ATSC 152 operates the flow control devices 192, 196, and 202 (FIG. 4) or the flow control devices 220 and 222 (FIG. 5) so that the exhaust gases from the engine 50 follow the first flow path through the aftertreatment system 90 in which the particulate filter 186 is downstream of the NOx reduction device 188 relative to such flow path. Thereafter, the ATSC 152 proceeds to step 262.

At step 262, the ATSC 152 determines if a signal and/or data has been provided by the supervisory controller 150 that operation of the engine is to be terminated. If operation of the engine is to be terminated, the ATSC 152, at step 264, operates the flow control devices 192, 196, and 202 (FIG. 4) or the flow control devices 220 and 222 (FIG. 5) to define the first flow path through the aftertreatment system 90 so that exhaust gases will follow such flow path when the engine 50 is reignited and exits. Otherwise, the ATSC 152 proceeds to step 254 to continue monitoring the temperature associated with the exhaust gases and defining the flow path of the exhaust gases through the aftertreatment system 90 accordingly.

Although the embodiments disclosed herein are described in connection with a work vehicle having a diesel engine system, it should be apparent to one who has ordinary skill in the art that aspects of these embodiments may be adapted to other types of work vehicles having other types of engines to manage aftertreatment of exhaust gases generated thereby. Further, aspects of such embodiments may even be used in other types of engines or motors not associated with vehicles as appropriate.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle having an engine that generates exhaust gases flowing through an exhaust flow path to an exhaust vent, the work vehicle comprising:
   a nitrogen-oxide (NOx) reduction device;
   a particulate filter;
   a temperature sensor sensing a temperature associated with the exhaust gases; and
   a plurality of flow control devices in the exhaust flow path between the engine and the exhaust vent and operable to define a first flow path based on the sensed temperature being less than a predetermined temperature threshold and a second flow path otherwise;
   wherein the NOx reduction device is upstream of the particulate filter relative to the exhaust flow path in the first flow path and the particulate filter is upstream of the NOx reduction device relative to the exhaust flow path in the second flow path.

2. The work vehicle of claim 1, wherein the particulate filter comprises a diesel oxidation catalyst and a diesel particulate filter or a catalyzed diesel particulate filter and wherein the NOx reduction device is an ammonia based selective catalytic reduction device.

3. The work vehicle of claim 1, wherein the plurality of flow control devices are operated to define the first flow path when operation of the engine is to be terminated.

4. The work vehicle of claim 1, further comprising a diesel exhaust fluid (DEF) injector, wherein the DEF injector injects DEF into the exhaust gases upstream of the particulate filter when the first flow path is defined and downstream of the particulate filter when the second flow path is defined.

5. The work vehicle of claim 1, wherein the plurality of flow control devices includes a first flow control device and a second flow control device, the first flow control device is operable to selectively couple an exhaust flow line from the engine to an input of the NOx reduction device or an input of the particulate filter, and the second flow control device is operable to selectively couple an output of the NOx reduction device or an output of the particulate filter to the exhaust vent.

6. The work vehicle of claim 5, wherein the first flow control device and the second flow control device are the only flow control devices operated to selectively change between the first flow path and the second flow path.

7. The work vehicle of claim 1, wherein the plurality of flow control devices includes a first flow control device and a second flow control device and when the plurality of flow control devices define the first flow path: (1) the first flow control device fluidly couples a first input flow line that receives the exhaust gases from the engine and a second input flow line of the NOx reduction device and decouples the first input flow line and a third input flow line of the particulate filter, and (2) the second flow control device fluidly couples an output flow line of the NOx reduction device and the third input flow line of the particulate filter and fluidly decouples the output flow line of the NOx reduction device and the exhaust vent.

8. The work vehicle of claim 7, wherein the first flow control device and the second flow control device are multiport valves.

9. The work vehicle of claim 1, comprising only one NOx reduction device disposed in the exhaust flow path.

10. The work vehicle of claim 1, further including a controller having a processing and memory architecture and configured to execute instructions to monitor the temperature sensor when the plurality of flow control devices define the first flow path, determine when the sensed temperature is greater than the predetermined temperature, and in response operate the plurality flow control devices to define the second flow path.

11. An aftertreatment system for a work vehicle having an engine that generates exhaust gases flowing through an exhaust flow path to an exhaust vent, the aftertreatment system comprising:
   a nitrogen-oxide (NOx) reduction device;
   a particulate filter;
   a temperature sensor sensing a temperature associated with the exhaust gases; and
   a plurality of flow control devices in the exhaust flow path operable to define a first low path between the engine and the exhaust vent based on the sensed temperature being less than a predetermined temperature threshold and a second flow path between the engine and the exhaust vent otherwise;
   wherein the NOx reduction device is upstream of the particulate filter in the first flow path and the particulate filter is upstream of the NOx reduction device in the second flow path.

12. The aftertreatment system of claim 11, wherein the particulate filter comprises a diesel oxidation catalyst and a diesel particulate filter or a catalyzed diesel particulate filter, and wherein the NOx reduction device comprises an ammonia based selective catalytic reduction device.

13. The aftertreatment system of claim 11, wherein the plurality of flow control devices are operated to define the first flow path when operation of the engine is to be terminated.

14. The aftertreatment system of claim 11, further including diesel exhaust fluid (DEF) injection device, wherein the DEF injection device injects DEF into the exhaust gases upstream of the particulate filter in the first flow path and downstream of the particulate filter in the second flow path.

15. The aftertreatment system of claim 11, wherein the plurality of flow control devices comprises a first flow control device and a second flow control device, the first flow control device is operable to selectively couple an exhaust flow line from the engine to an input of the NOx reduction device or an input the particulate filter, and the second flow control device is operable to selectively couple an output of the NOx reduction device or an output of the particulate filter to the exhaust vent.

16. The aftertreatment system of claim 15, wherein only the first flow control device and the second flow control device are operated to selectively change between the first flow path and the second flow path.

17. The aftertreatment system of claim 11, wherein the plurality of flow control devices comprises a first flow control device and a second flow control device, and when the first flow path is defined: (1) the first flow control device fluidly couples a first input flow line that receives the gases from the engine and a second input flow line of the NOx reduction device and decouples the first input flow line and a third input flow line of the particulate filter and (2) the second flow control device fluidly couples an output flow line of the NOx reduction device and the third input flow line of the particulate filter and fluidly decouples the output flow line of the NOx reduction device and the exhaust vent.

18. The aftertreatment system of claim 17, wherein the first flow control device and the second flow control device are multiport valves.

19. The aftertreatment system of claim 11, wherein only one NOx reduction device is disposed between the engine and the exhaust vent.

20. The aftertreatment system of claim 11, further including a controller having a processing and memory architecture and configured to execute instructions to monitor the temperature sensor when the plurality of flow control devices define the first flow path, determine when the sensed temperature is greater than the predetermined temperature, and in response operate the flow control devices to define the second flow path.

* * * * *